May 23, 1939.　　E. WAAGE ET AL　　2,159,464
AUTOMOBILE HEADLIGHT
Filed May 24, 1938　　2 Sheets-Sheet 1

Inventor
Edward Waage
Knut E. Lindhagen
By Clarence A. O'Brien
and Hyman Berman
Attorneys Inventor
Edward Waage
Knut E. Lindhagen By Clarence A. O'Brien
and Hyman Berman
Attorneys Patented May 23, 1939

2,159,464

UNITED STATES PATENT OFFICE 2,159,464

AUTOMOBILE HEADLIGHT

Edward Waage and Knut E. Lindhagen, Port Richmond, Staten Island, N. Y.

Application May 24, 1938, Serial No. 209,770

2 Claims. (Cl. 240—41.6)

This invention relates to automobiles headlights and an object of the invention is to eliminate glare from the headlight.

Figure 1:
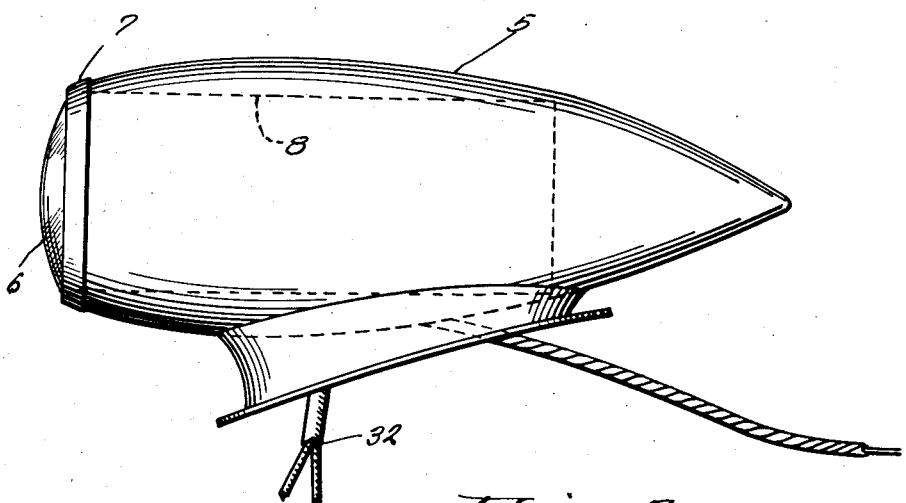
Figure 2:
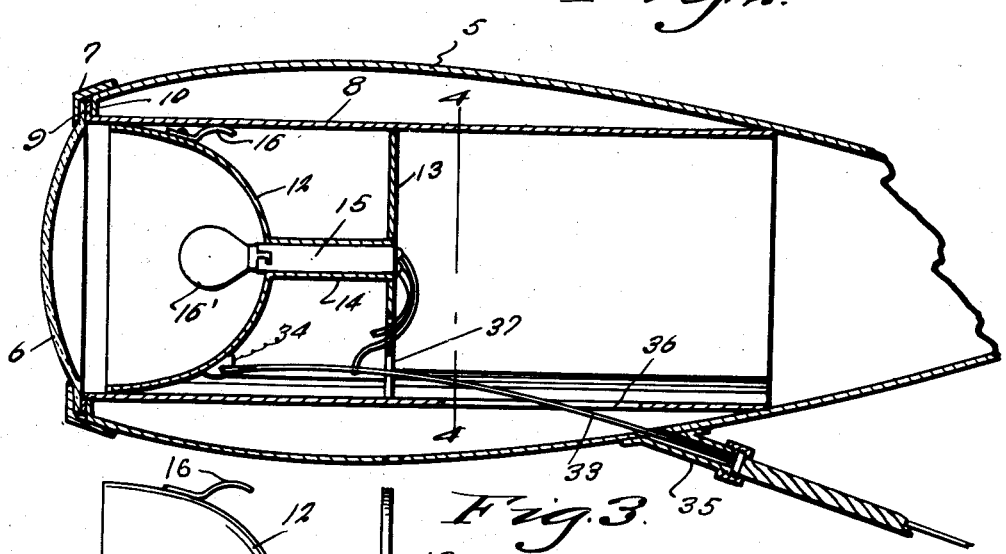
Figure 3:
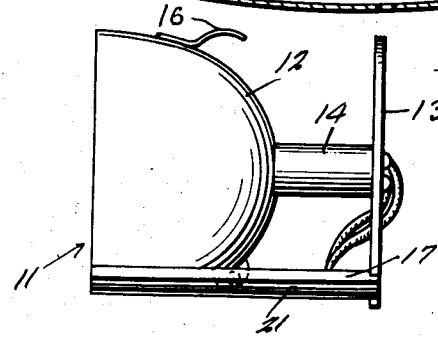
Figure 4:
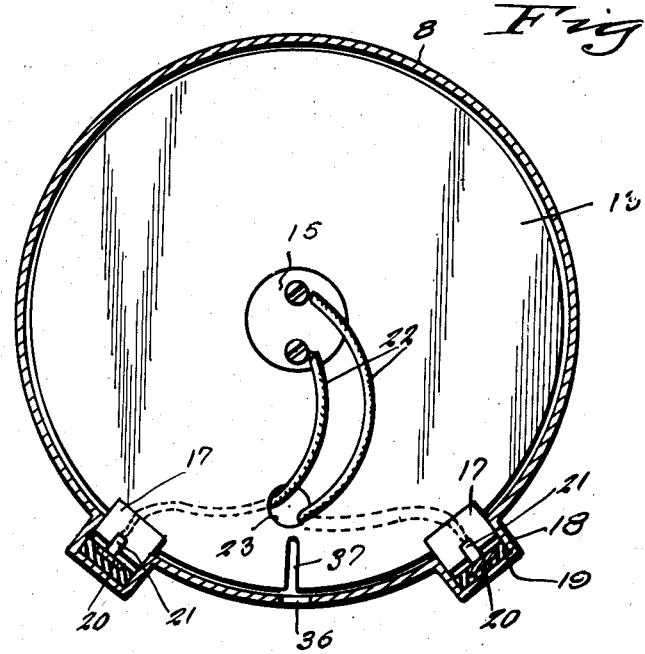
Figure 5:
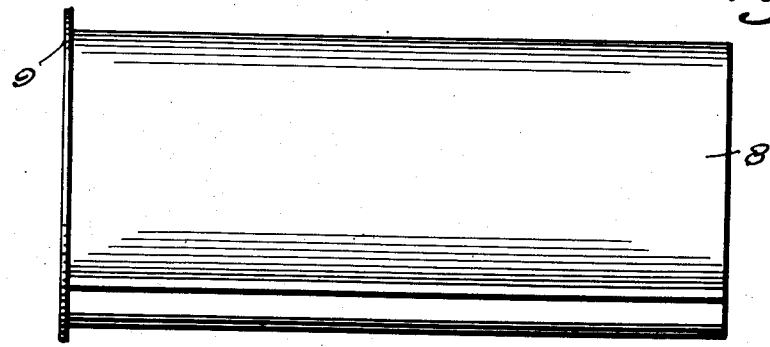
Figure 6:
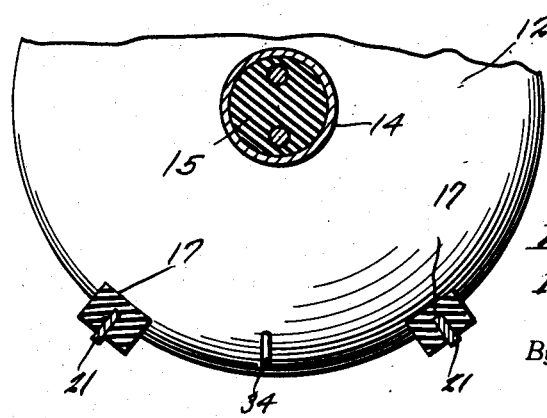

More particularly the invention has reference to that type of glare-eliminating headlights embodying an adjustable reflector; and the invention together with its objects and advantages will be best understood from a study of the following description taken in connection with the accompanying drawings wherein:

Figure 1 is a side elevational view of a headlight having our invention applied thereto, Figure 2 is a longitudinal sectional view through the headlight further illustrating the application of the invention, Figure 3 is a side elevational view of a reflector assembly, Figure 4 is an enlarged transverse sectional view taken substantially on the line 4—4 of Figure 2, Figure 5 is a side elevational view of a guide cylinder hereinafter more fully referred to, and Figure 6 is an enlarged fragmentary transverse sectional view through the reflector assembly shown in Figure 3.

Referring to the drawings by reference numerals it will be seen that 5 indicates generally the shell of an automobile headlight. The shell 5 is generally of well-known construction and of any suitable design. In addition to the shell 5 the headlight is equipped with the usual lens 6 and retaining flange 7 therefor.

In accordance with the present invention there is placed within the shell 5 of the headlight an elongated open-ended guide cylinder 8 which at the forward end thereof is provided with an outstanding flange 9 that is clamped between the rim of the lens 6 and the abutment flange 10 of the shell 5 as clearly shown in Figure 2. It will thus be seen that the cylinder 8 is retained within the shell 5 in substantially the same manner as a reflector is conventionally retained in a headlight shell.

Having a sliding fit within the guide cylinder 8 is a reflector assembly indicated generally by the reference numeral 11.

As shown the reflector assembly 11, in the preferred embodiment of the invention comprises a parabolic reflector 12 behind which and spaced therefrom is a disk 13 that is connected to the rear of the reflector 12 through the medium of a tube 14 that forms a housing for an incandescent lamp socket 15. Socket 15 is adapted to accommodate an incandescent lamp or other suitable light source 16' as shown and in horizontal position with respect to the center of the reflector 12.

Reflector 12 and disk 13 fit snugly within the cylinder 8 with but sufficient clearance to permit sliding movement of the assembly longitudinally of the cylinder 8.

Untoward longitudinal shifting movement of the assembly is guarded against through the medium of a suitable spring element 16 mounted on the reflector 12 and having frictional engagement with the wall of the cylinder 8 as clearly shown in Figures 2 and 3.

The disk 13 is braced with respect to the reflector 12 through the medium of a pair of oppositely disposed brace rods 17 of insulating material.

Rods 17 have a sliding fit within guide channels 18 provided therefor on the peripheral wall of the cylinder 8 as best shown in Figure 4.

Snugly fitted within the guide channels 18 are blocks or strips 19 of insulating material in which are embedded conductor strips 20.

Current to the contact strips 20 is conducted from any source of supply by a conductor 32.

Carried by the insulated brace bars or strips 17 are conductor strips 21 that have sliding contact with the conductor strips 20, and these strips 21 are connected with the lamp socket 15 through the medium of wires 22 as also clearly shown in Figure 4. To accommodate the wires 22 disk 13 is provided with an aperture 23 as also best shown in Figure 4.

To slide the assembly 11 to advance or retract said assembly a Bowden wire or the like, operated from the instrument board or from any other convenient location, and indicated by the reference numeral 33 is employed and is connected at one end in a suitable manner to an apertured lug 34 provided therefor on the rear of the reflector 12 adjacent the bottom of the latter. To accommodate the wire 33 the shell 5 is provided with a tubular conduit 35; the cylinder 8 on the lower side thereof is provided with an elongated slot 36 and the disk 13 at the bottom thereof is provided with a radial slot 37 all of which will be clear from a study of Figures 2 and 4.

From the above it will be apparent that in the operation of the reflector for the purpose intended, when the assembly 11 is in the normally projected position shown in Figure 2 the beam or shaft of light is intensely projected on the road straight ahead of the vehicle. When, at the approach of an oncoming car, the operator desires to eliminate the glare in the eyes of the operator of the car that is being driven from an opposite direction, the operator of the car equipped with the invention exerts a pull on the Bowden wire 33 for causing the assembly 11 to slide inwardly with respect to the forward end of the guide cylinder 8. With the assembly 11 in this inward position the rays of light will diffuse upon the road-bed directly in front of the vehicle but ouside the range of vision of the eyes of the driver of the oncoming vehicle. Manifestly, a push exerted on the Bowden wire 33 will cause the assembly 11 to slide forwardly to the normal position shown in Figure 2.

It is thought that a clear understanding of the construction, utility and advantage and operation of an invention of this character will be had without a more detailed description.

Having thus described the invention what is claimed as new is:

1. In a lamp of the character described, a lamp casing, a horizontal open-ended guide cylinder arranged within said casing and provided adjacent the bottom thereof with longitudinally extending guide channels, conductor strips arranged within said channels and insulated from said guide cylinder, an assembly slidably fitted within said guide cylinder and including a parabolic reflector having an incandescent lamp socket accommodating tube extending rearwardly therefrom, a disk on the free end of said tube, bars of insulating material extending between said disk and reflector and having a sliding fit within the guide channels, conductor strips carried by said insulated bars and having sliding contact with the first-mentioned conductor strips, a lamp socket arranged within said tube and electrically connected with the second-named pair of conductor strips, an incandescent bulb mounted in the lamp socket and supported thereby in operative position to said reflector, and remote control means connected with said assembly for sliding the latter longitudinally of the guide tube to the desired position of adjustment.

2. In a lamp of the character described, a lamp casing, a horizontal open ended guide cylinder arranged within said casing and provided adjacent the bottom thereof with longitudinally extending guide channels, conductor strips arranged within said channels and insulated from said guide cylinder, an assembly slidably fitted within said guide cylinder and including a parabolic reflector having an incandescent lamp socket accommodating tube extending rearwardly therefrom, bars of insulating material extending from said reflector and having a sliding fit within the guide channels, conductor strips carried by said insulating bars and having sliding contact with the first-mentioned conductor strips, a lamp socket arranged within said tube and electrically connected with the second-named pair of conductor strips, an incandescent bulb mounted in the lamp socket and supported thereby in operative position to said reflector, and remote control means connected with said assembly for sliding the latter longitudinally of the guide cylinder to the desired position of adjustment.

EDWARD WAAGE.
KNUT E. LINDHAGEN.